US012159773B2

(12) United States Patent
Arens et al.

(10) Patent No.: US 12,159,773 B2
(45) Date of Patent: Dec. 3, 2024

(54) CALIBRATION OF MASS SPECTROMETRY SYSTEMS

(71) Applicant: Roche Diagnostics Operations, Inc., Indianapolis, IN (US)

(72) Inventors: Nadja Arens, Starnberg (DE); Daniel Intelmann, Schaftlach (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 192 days.

(21) Appl. No.: 17/809,760

(22) Filed: Jun. 29, 2022

(65) Prior Publication Data

US 2022/0328295 A1 Oct. 13, 2022

Related U.S. Application Data

(63) Continuation of application No. PCT/EP2021/050237, filed on Jan. 8, 2021.

(30) Foreign Application Priority Data

Jan. 10, 2020 (EP) .................................... 20151159

(51) Int. Cl.
*H01J 49/00* (2006.01)
*H01J 49/42* (2006.01)

(52) U.S. Cl.
CPC ........ *H01J 49/0009* (2013.01); *H01J 49/421* (2013.01)

(58) Field of Classification Search
CPC .. H01J 49/0009; H01J 49/421; H01J 49/0036; H01J 49/42
See application file for complete search history.

(56) References Cited

U.S. PATENT DOCUMENTS

2012/0109537 A1 5/2012 Makarov
2012/0158318 A1 6/2012 Wright

OTHER PUBLICATIONS

Garofolo, Fabio, LC-MS Instrument Calibration, Analytical Method Validation and Instrument Preference Verification, 2004, pp. 197-220, Ch. 13, John Wiley & Sons (Year: 2004).*
Garofolo, Fabio, LC-MS Instrument Calibration, Analytical Method Validation and Instrument Preference Verification, 2004, pp. 197-220, Ch. 13, John Wiley and Sons (Year: 2004).*

(Continued)

*Primary Examiner* — David E Smith
(74) *Attorney, Agent, or Firm* — Taft Stettinius & Hollister LLP

(57) ABSTRACT

Systems for analyzing a biological sample include a separation unit configured to separate a component from the biological sample, an ionization unit configured to generate a plurality of ions from the component, an adjustable mass-selective filtering element, a detector configured to detect ions that pass through the mass-selective filtering element, and a controller connected to the mass-selective filtering element and to the detector, where the controller is configured so that during operation of the system, the controller adjusts the mass-selective filtering element and activates the detector to measure at least three different ion signals corresponding to the plurality of ions, and determines a mass axis shift of the system based on the at least three different ion signals.

15 Claims, 4 Drawing Sheets

(56) References Cited

OTHER PUBLICATIONS

Barshich, Christopher M. et al., Application of glow discharge Fourier-transform ion cyclotron resonance mass spectrometry to isotope ratio measurements, International Journal of Mass Spectrometry, 1998, pp. 73-79, vol. 178.
Garofolo, Fabio, LC-MS Instrument Calibration, Analytical Method Validation and Instrument Performance Verification, 2004, pp. 197-220, Ch. 13, John Wiley & Sons, Inc.
International Search Report issued Mar. 24, 2021, in Application No. PCT/EP2021/050237, 3 pp.

* cited by examiner

CALIBRATION OF MASS SPECTROMETRY SYSTEMS

CROSS-REFERENCE TO RELATED APPLICATIONS

This application is a continuation of International Patent Application No. PCT/EP2021/050237, filed 8 Jan. 2021, which claims priority to European Patent Application No. 20151159.9, filed 10 Jan. 2020, the disclosures of which are hereby incorporated by reference in their entirety.

TECHNICAL FIELD

This disclosure relates to mass spectrometry systems.

BACKGROUND OF THE DISCLOSURE

Mass spectrometry (MS) systems are widely used for the analysis of biological samples, due to their high resolution and ability to analyze relatively small sample volumes, relative to certain other analytical methods. As part of an analytical workflow, mass spectrometry systems can be coupled to liquid chromatography (LC) separation systems. Complex samples such as body fluids can be injected into the LC separation system and separated into sequentially eluted components, which are then analyzed on the MS system. The combination of LC separation and selective MS-based analysis allows a wide variety of different samples to be quantitatively analyzed.

Mass spectrometry systems can be calibrated using a variety of methods. Prior to analyzing samples, such systems typically undergo an initial calibration to ensure that measured mass-to-charge (m/z) ratios are consistent with known values. If such systems remain in use over relatively long periods of time, the initial calibration can drift due to factors such as temperature fluctuations. Continued use of the systems without re-calibration can yield inaccurate ion m/z measurements. As such measurements are typically used to identify analytes, erroneous or anomalous identifications can result.

Calibration of a mass spectrometry system can be performed by introducing a "standard" (or reference) sample, and measuring the ion fragmentation pattern that is generated by the standard sample. For mass spectrometry systems that are coupled to liquid chromatography columns, however, introducing the standard sample can involve disconnecting the column from the mass spectrometry system to introduce the standard sample, placing the mass-spectrometry system in "off-line" mode. Ionization parameters and other process parameters may also have to be adjusted, depending upon the nature of the standard sample. For a mass spectrometry system that is in continuous or near-continuous use for analyzing samples, the down time associated with modifying the instrument configuration and re-calibrating the system leads to reduced utilization, negatively impacting overall sample measurement throughput.

SUMMARY

Although the embodiments of the present disclosure are not limited to specific advantages or functionality, it is noted that in accordance with the present disclosure systems and methods that implement calibration procedures are provided that can be performed on-line for LC-MS systems.

In accordance with one embodiment of the present disclosure, a system for analyzing a biological sample is provided, the system comprising: a separation unit configured to separate a component from the biological sample; an ionization unit configured to generate a plurality of ions from the component; an adjustable mass-selective filtering element; a detector configured to detect ions that pass through the mass-selective filtering element; and a controller connected to the mass-selective filtering element and to the detector, wherein the controller is configured so that during operation of the system, the controller: adjusts the mass-selective filtering element and activates the detector to measure at least three different ion signals corresponding to the plurality of ions; and determines a mass axis shift of the system based on the at least three different ion signals.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

DESCRIPTION OF THE DRAWINGS

The following detailed description of the embodiments of the present description can be best understood when read in conjunction with the following drawings, where like structure is indicated with like reference numbers and in which.

Figure 1:
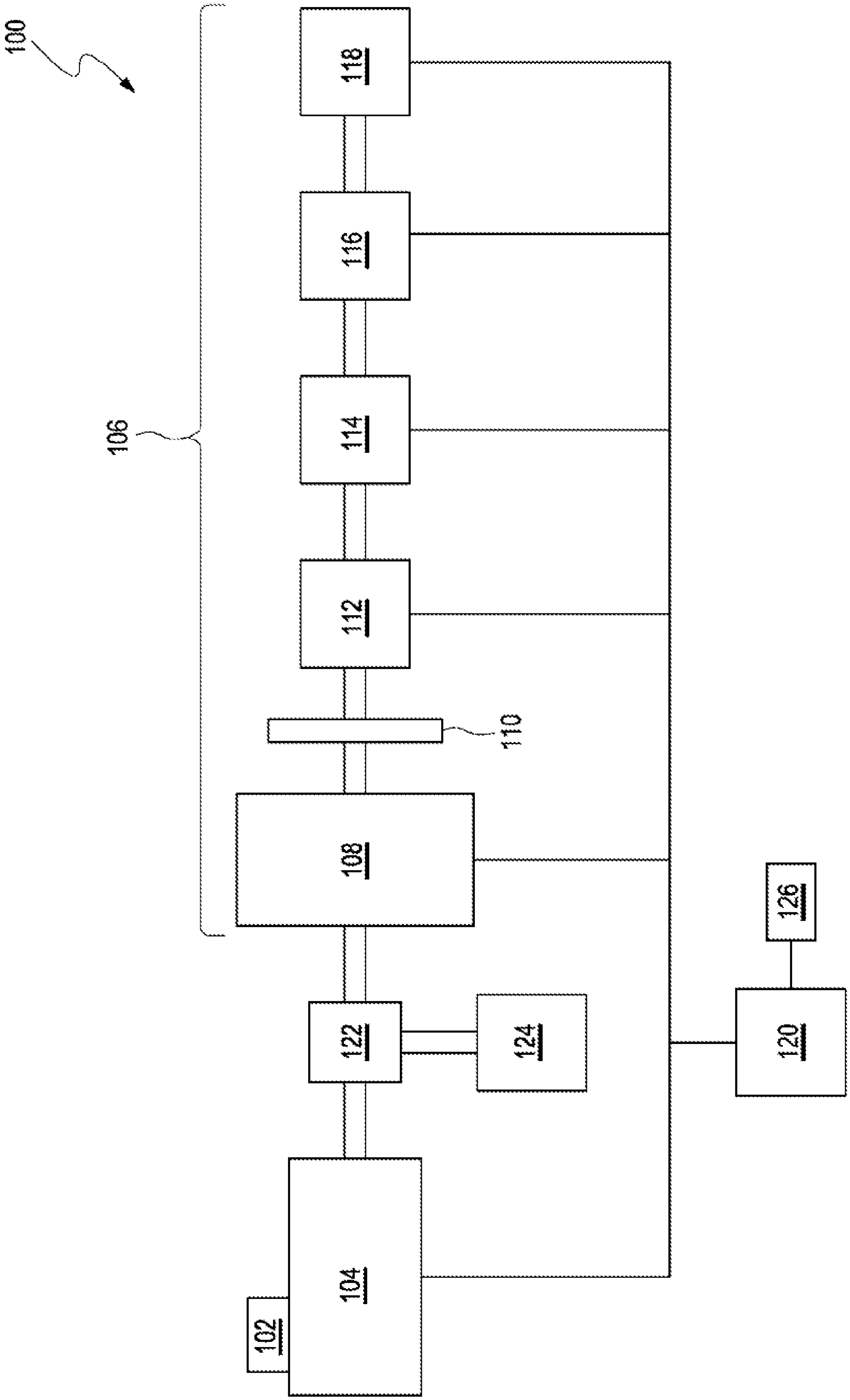
FIG. 1 is a schematic diagram showing an example of a liquid chromatography-mass spectrometry system in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

The present disclosure features systems and methods that implement calibration procedures that can be performed on-line for LC-MS systems. The mass spectrometer is not de-coupled from the chromatography system or otherwise taken off-line for calibration, so that calibration can be performed rapidly and accurately, and the calibrated system can be returned to service after only a short interval. Because calibration does not involve de-coupling the LC and MS systems, the calibration can readily be performed by a technician, or even in fully automated fashion, without significant mechanical intervention and instrument re-configuration. For instruments that operate in clinical environments, in particular, performing calibration without such intervention can be highly desirable.

In one aspect, the disclosure features systems for analyzing a biological sample that include: a separation unit configured to separate a component from the biological sample; an ionization unit configured to generate a plurality of ions from the component; an adjustable mass-selective filtering element; a detector configured to detect ions that pass through the mass-selective filtering element; and a controller connected to the mass-selective filtering element and to the detector, where the controller is configured so that during operation of the system, the controller adjusts the mass-selective filtering element and activates the detector to measure at least three different ion signals corresponding to the plurality of ions, and determines a mass axis shift of the system based on the at least three different ion signals.

In another aspect, the disclosure features systems for analyzing a biological sample that include: a separation unit configured to separate a component from the biological sample; an ionization unit configured to generate a plurality of ions from the component; an adjustable mass-selective filtering element; a detector configured to detect ions that pass through the mass-selective filtering element; and a controller connected to the mass-selective filtering element and to the detector. The controller is configured so that during operation of the system, the controller is configured to: adjust the mass-selective filtering element so that ions having a first mass-to-charge ratio q pass through the mass-selective filtering element; activate the detector to measure a first ion signal corresponding to a common ion type among the plurality of ions; adjust the mass-selective filtering element so that ions having a second mass-to-charge ratio $q_a<q$ pass through the mass-selective filtering element; activate the detector to measure a second ion signal corresponding to the common ion type; adjust the mass-selective filtering element so that ions having a third mass-to-charge ratio $q_b>q$ pass through the mass-selective filtering element; activate the detector to measure a third ion signal corresponding to the common ion type; determine intensity maxima of each of the first, second, and third ion signals, and fit the intensity maxima to a functional form comprising a local maximum within a mass-to-charge ratio range from $q_a$ to $q_b$; and determine a mass axis shift of the system based on a shift of the local maximum relative to the intensity maximum of the first ion signal, where $(q-q_a)$ is 0.4 atomic mass units (amu) or less and $(q_b-q)$ is 0.4 atomic mass units (amu) or less.

Embodiments of any of the systems can include any one or more of the following features.

Each of the three different ion signals can correspond to a different mass-to-charge ratio for the mass-selective filtering element. The mass-selective filtering element can be configured so that ions corresponding to the mass-to-charge ratio pass through the mass-selective filtering element. The controller can be configured so that during operation of the system, the controller adjusts the mass-selective filtering element by adjusting one or more electrical potentials applied to electrodes of the mass-selective filtering element. The mass-selective filtering element can include a quadrupolar electrode assembly.

Each of the at least three different ion signals can correspond to a common ion type among the plurality of ions. The common ion type can have an associated mass-to-charge value q, and the controller can be configured to activate the detector to measure a first ion signal of the at least three different ion signals with the mass-selective filtering element adjusted to pass ions having a mass-to-charge ratio of $(q-a)<q$. The value a can be 0.4 atomic mass units (amu) or less (e.g., 0.2 amu or less). The controller can be configured so that during operation of the system, the controller activates the detector to measure a second ion signal of the at least three different ion signals with the mass-selective filtering element adjusted to pass ions having a mass-to-charge ratio of $(q+b)>q$. The value b can be 0.4 amu or less (e.g., 0.2 amu or less). The controller can be configured so that during operation of the system, the controller activates the detector to measure a third ion signal of the at least three different ion signals with the mass-selective filtering element adjusted to pass ions having a mass-to-charge ratio of q.

The controller can be configured so that during operation of the system, the controller determines the mass axis shift based on attribute values of the at least three different ion signals. The attribute can include a peak intensity of each of the at least three different ion signals and/or an area under each of the at least three different ion signals and/or a peak width of each of the at least three different ion signal and/or a magnitude of a derivative signal of each of the at least three different ion signals.

The controller can be configured so that during operation of the system, the controller fits a functional form to the attribute values, determines a local maximum of the functional form, and determines the mass axis shift based on the local maximum of the functional form. The functional form can correspond to a Gaussian function or to a polynomial function.

The controller can be configured so that during operation of the system, the controller determines the mass axis shift by determining a mass shift associated with the local maximum of the functional form. The common ion type can have an associated mass-to-charge value q, and the controller can be configured so that during operation of the system, the controller determines the mass shift associated with the local maximum of the functional form relative to the mass-to-charge value q. The mass shift associated with the local maximum of the functional form can correspond to the mass axis shift.

The controller can be configured so that during operation of the system, the controller adjusts a mass axis calibration for the mass-selective filtering element based on the mass axis shift. The at least three different ion signals can include five or more (e.g., seven or more) different ion signals.

The common ion type can have an associated mass-to-charge value q, and the controller can be configured to activate the detector to measure n different ion signals of the at least three different ion signals, each of the n different ion signals being measured with the mass-selective filtering element adjusted by the controller to pass ions having a different mass-to-charge ratio of $(q-a_n)<q$, where n is 2 or more (e.g., where n is 3 or more).

The controller can be configured to activate the detector to measure m different ion signals of the at least three different ion signals, each of the m different ion signals being measured with the mass-selective filtering element adjusted by the controller to pass ions having a different mass-to-charge ratio of $(q+b_m)>q$, where m is 2 or more (e.g., where m is 3 or more). The values of n and m can be different.

The controller can be configured so that during operation of the system, the controller periodically determines a new mass axis shift value of the system, and adjusts the mass axis calibration for the mass-selective filtering element based on the new mass axis shift value.

The systems can include a temperature sensor configured to measure a temperature of a component of the system or a temperature of an environment of the system, where the controller is configured so that during operation of the system, the controller determines a new mass axis shift value of the system and adjusts the mass axis calibration for the mass-selective filtering element based on the new mass axis shift value if the measured temperature is outside a selected temperature range.

The controller can be configured so that during operation of the system the controller determines a value of an attribute of at least one ion signal measured by the detector and corresponding to the biological sample, and determines a new mass axis shift value of the system and adjusts the mass axis calibration for the mass-selective filtering element based on the new mass axis shift value if the attribute value is outside a selected range of values for the attribute. The attribute can correspond to a member selected from the group consisting of a peak intensity of the ion signal, a width of the ion signal, an area under the ion signal, and a value obtained from a derivative signal of the ion signal.

The mass-selective filtering element can be a first mass-selective filtering element, the at least three different ion signals can be a first set of at least three different ion signals, and the mass axis shift of the system can be associated with the first mass-selective filtering element, and the systems can include a second mass-selective filtering element positioned downstream from the first mass-selective filtering element. The controller can be connected to the second mass-selective filtering element and configured so that during operation of the system, the controller adjusts the second mass-selective filtering element and activates the detector to measure a second set of at least two different ion signals corresponding to the plurality of ions, and determines a mass axis shift of the system associated with the second mass-selective filtering element based on the second set of at least two different ion signals. The controller can be configured so that during operation of the system, the controller adjusts a mass axis calibration for the second mass-selective filtering element based on the mass axis shift associated with the second mass-selective filtering element.

The component of the sample can be a first component of the biological sample, the plurality of ions can be a first plurality of ions, and the mass axis shift can be first mass axis shift associated with the first component, the separation unit can be configured to separate a second component from the biological sample, the ionization unit can be configured to generate a second plurality of ions from the second component, and the controller can be configured so that during operation of the system, the controller adjusts the mass-selective filtering element and activates the detector to measure at least three different ion signals corresponding to the second plurality of ions, and determines a second mass axis shift of the system associated with the second component based on the at least three different ion signals corresponding to the second plurality of ions. The first and second components can be different. The controller can be configured so that during operation of the system, the controller determines an overall mass axis shift of the system based on the first and second mass axis shifts. The controller can be configured so that during operation of the system, the controller determines the overall mass axis shift of the system by averaging the first and second mass axis shifts.

The separation unit can include at least one chromatography column. The separation unit can separate the component from the biological sample by liquid chromatography.

Embodiments of the systems can also include any of the other features described herein, and can include any combinations of features described in connection with the same or different embodiments, except as expressly stated otherwise.

In another aspect, the disclosure features methods for determining a mass axis shift of a system for analyzing a biological sample, the methods including separating a component from a biological sample, generating a plurality of ions from the component, adjusting a mass-selective filtering element of the system and measuring at least three different ion signals, where each ion signal corresponds to a common ion type among the plurality of ions and a different mass-to-charge ratio for ions that pass through the mass-selective filtering element, and determining a mass axis shift for the system based on the at least three different ion signals, where a difference between any two of the mass-to-charge ratios corresponding to the ion signals is less than 0.5 atomic mass units (amu).

Embodiments of the methods can include any one or more of the following features.

Each of the three different ion signals can correspond to a different mass-to-charge ratio for the mass-selective filtering element. The mass-selective filtering element can be configured so that ions corresponding to the mass-to-charge ratio pass through the mass-selective filtering element. The methods can include adjusting the mass-selective filtering element by adjusting one or more electrical potentials applied to electrodes of the mass-selective filtering element.

Each of the at least three different ion signals can correspond to a common ion type among the plurality of ions. The common ion type can have an associated mass-to-charge value q, and the methods can include measuring a first ion signal of the at least three different ion signals with the mass-selective filtering element adjusted to pass ions having a mass-to-charge ratio of $(q-a)<q$. The value of a can be 0.4 atomic mass units (amu) or less (e.g., 0.2 amu or less).

The methods can include measuring a second ion signal of the at least three different ion signals with the mass-selective filtering element adjusted to pass ions having a mass-to-charge ratio of $(q+b)>q$. The value of b can be 0.4 amu or less (e.g., 0.2 amu or less).

The methods can include measuring a third ion signal of the at least three different ion signals with the mass-selective filtering element adjusted to pass ions having a mass-to-charge ratio of q.

The methods can include determining the mass axis shift based on attribute values of the at least three different ion signals. The attribute can include one or more of a peak intensity of each of the at least three different ion signals, an area under each of the at least three different ion signals, a peak width of each of the at least three different ion signals, and a magnitude of a derivative signal of each of the at least three different ion signals.

The methods can include fitting a functional form to the attribute values, determining a local maximum of the functional form, and determining the mass axis shift based on the local maximum of the functional form. The functional form can correspond to a Gaussian function. The functional form can correspond to a polynomial function.

The methods can include determining the mass axis shift by determining a mass shift associated with the local maximum of the functional form. The common ion type can have an associated mass-to-charge value q, and the methods can include determining the mass shift associated with the local maximum of the functional form relative to the mass-to-charge value q.

The mass shift associated with the local maximum of the functional form can correspond to the mass axis shift. The methods can include adjusting a mass axis calibration for the mass-selective filtering element based on the mass axis shift.

The at least three different ion signals can include five or more (e.g., seven or more) different ion signals.

The common ion type can have an associated mass-to-charge value q, and the methods can include measuring n different ion signals of the at least three different ion signals, each of the n different ion signals being measured with the mass-selective filtering element adjusted to pass ions having a different mass-to-charge ratio of $(q-a_n)<q$, where n is 2 or more (e.g., 3 or more). The methods can include measuring m different ion signals of the at least three different ion signals, each of the m different ion signals being measured with the mass-selective filtering element adjusted by the controller to pass ions having a different mass-to-charge ratio of $(q+b_m)>q$, where m is 2 or more (e.g., 3 or more). The values of n and m can be different.

The methods can include periodically determining a new mass axis shift value, and adjusting the mass axis calibration for the mass-selective filtering element based on the new mass axis shift value.

The methods can include measuring a temperature a component of the system or a temperature of an environment of the system, and determining a new mass axis shift value and adjusting the mass axis calibration for the mass-selective filtering element based on the new mass axis shift value if a measured temperature is outside a selected temperature range.

The methods can include determining a value of an attribute of at least one ion signal corresponding to the biological sample, and determining a new mass axis shift value and adjusting the mass axis calibration for the mass-selective filtering element based on the new mass axis shift value if the attribute value is outside a selected range of values for the attribute. The attribute can correspond to a member selected from the group consisting of a peak intensity of the ion signal, a width of the ion signal, an area under the ion signal, and a value obtained from a derivative signal of the ion signal.

The mass-selective filtering element can be a first mass-selective filtering element, the at least three different ion signals can be a first set of at least three different ion signals, and the mass axis shift can be associated with the first mass-selective filtering element, and the methods can include adjusting a second mass-selective filtering element of the system positioned downstream from the first mass-selective filtering element, measuring a second set of at least two different ion signals corresponding to the plurality of ions, and determining a mass axis shift associated with the second mass-selective filtering element based on the second set of at least two different ion signals. The methods can include adjusting a mass axis calibration for the second mass-selective filtering element based on the mass axis shift associated with the second mass-selective filtering element.

The component of the sample can be a first component of the biological sample, the plurality of ions can be a first plurality of ions, and the mass axis shift can be first mass axis shift associated with the first component, and the methods can include separating a second component from the biological sample, generating a second plurality of ions from the second component, adjusting the mass-selective filtering element and measuring at least three different ion signals corresponding to the second plurality of ions, and determining a second mass axis shift associated with the second component based on the at least three different ion signals corresponding to the second plurality of ions. The first and second components can be different.

The methods can include determining an overall mass axis shift based on the first and second mass axis shifts. The methods can include determining the overall mass axis shift by averaging the first and second mass axis shifts.

The methods can include separating the component from the biological sample by liquid chromatography.

Embodiments of the methods can also include any of the other features described herein, and can include any combinations of features described in connection with the same or different embodiments, except as expressly stated otherwise.

As used herein, the term "about" means "approximately" (e.g., plus or minus 10% of the indicated value).

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a", "an", and "the" include plural reference unless the context clearly dictates otherwise. Thus, for example, a reference to "a mass shift" includes a plurality of such mass shifts.

Unless otherwise defined, all technical and scientific terms used herein have the same meaning as commonly understood by one of ordinary skilled in the art to which this disclosure belongs. Although methods and materials similar or equivalent to those described herein can be used in the practice of the present methods and systems, suitable methods and systems are described below. All publications, patent applications, patents, and other references mentioned herein are incorporated by reference in their entirety. In case of conflict, the present specification, including definitions, will control. In addition, the methods and examples are illustrative only and not intended to be limiting.

Coupled liquid chromatography-mass spectrometry (LC-MS) systems are used to analyze a variety of biological samples. Such systems implement an end-to-end workflow in which a sample (e.g., a body fluid such as blood, urine) is injected into an inlet of the liquid chromatography column, the sample is separated into components on the column, and individual components are eluted from the column. The eluted components are directed into the mass spectrometer where they are ionized and analyzed. The mass spectrometer measures ion fragmentation patterns associated with each of the components. Each ion fragmentation pattern consists of one or more peaks corresponding to ion fragments with particular m/z ratios. The pattern of peaks for a particular analyte (e.g., the m/z ratios and intensities of the peaks) effectively function as a "fingerprint" for the analyte.

Due to the complex nature of the fragmentation pattern, a wide variety of components can be identified and quantified based on such measurements. Typically, identification is performed by comparing a measured ion fragmentation pattern with reference information (e.g., previously measured or simulated ion fragmentation patterns for known components). Identification of particular components can also be performed based on the time interval between initial introduction of the sample (e.g., injection into the inlet of the LC-MS system) and elution of a component from the LC column, or the time interval between initial introduction of the sample and measurement of a component ion fragmentation pattern in the mass spectrometer. Certain components may migrate through the LC column at particular rates, and the elapsed time interval can be used as an indicator of the component's identity. As with ion fragmentation patterns described above, the elapsed time interval can be compared with reference information (e.g., previously measured migration and/or measurement times for known components) to determine the component's identity.

To ensure that component identification is accurate and component populations can be measured quantitatively, LC-MS systems are generally calibrated prior to use. Further, when such systems are in continuous or near-continuous use, such as in a clinical or laboratory environment, the systems can be re-calibrated periodically, and/or when a drift in the system calibration is detected or suspected. Conventional re-calibration procedures involve taking the systems off-line so that they are no longer analyzing biological samples. Further, for many LC-MS systems, conventional calibration procedures can involve de-coupling the chromatography column from the mass spectrometer to introduce a reference sample, and in some circumstances, altering the mass spectrometer configuration to analyze the reference sample (e.g., changing the configuration from LC-MS to direct infusion). In other words, such procedures can involve a significant amount of interventional instrument re-configuration, which is either performed by the user, or deferred until a suitably trained technician is available to perform the work. Following calibration, the liquid chromatography column is re-connected to the mass spectrometer and, if necessary, the LC-MS system's analysis configuration is adjusted so that biological samples can be analyzed.

The extent of user intervention in the foregoing conventional calibration procedures may be highly disadvantageous for LC-MS systems that are deployed in clinical and laboratory environments, where users of the systems may have little training or experience with chromatography and/or mass spectrometry hardware and systems configuration. In addition, the time during which the LC-MS systems are off-line for calibration represents downtime—samples are not analyzed during this time, which reduces the effective duty cycle and utilization of the systems. For high-throughput environments in which hundreds or thousands of samples are analyzed in a day, such downtime can be a significant drawback.

The present disclosure features systems and methods that implement on-line calibration procedures during which LC-MS systems are not taken off-line. That is, the chromatography column is not disconnected from the mass spectrometer. As a result, the calibration procedures can be performed significantly more rapidly than certain conventional calibration procedures, and with significantly less user intervention. Certain implementations, in fact, may involve little to no user intervention at all, and can be performed in fully automated fashion by a LC-MS system.

The systems and methods described herein can implement calibration procedures in which multiple calibration parameters are adjusted (e.g., optimized) in a single calibration procedure. Thus, for example, when an LC-MS system includes multiple ion filtering stages, each stage can be independently calibrated and adjusted in a single calibration procedure, such that the system is fully calibrated at the conclusion of the procedure. Following calibration, the system can be immediately returned to the analysis of biological samples.

Conventional calibration procedures typically rely on a dedicated calibration sample, such as a material containing polypropylene glycol polymers. Such materials may generate ion peaks at m/z values that are relatively close to the expected ion peaks from particular sample components of interest. However, in some circumstances, the ion peaks generated from a dedicated calibration sample may be relatively far from the expected ion peaks corresponding to sample components of interest. In such circumstances, calibrating the system based on the dedicated calibration sample may yield a system for which the calibration within a m/z window of interest is still in doubt.

In contrast, the systems and methods described herein can be used with a wide variety of reference samples for system calibration, ensuring that the calibration can always be performed within a m/z region that is commensurate with the sample components to be measured. In some embodiments, the reference sample used for calibration is an isotope-enriched or isotope-labeled version of a particular sample component. Examples of such reference samples include, but are not limited to, testosterone, gabapentin, and cyclosporine. More generally, any reference sample can be used, and the choice of reference sample can be depend on the nature of the sample component(s) of interest.

Isotope-labeled reference samples generally include isotopic substitution at one or more sites within the molecular structure of the samples. Isotopes that can be used as labels (in place of their more commonly abundant counterparts) include, but are not limited to, carbon-13, deuterium, tritium, oxygen-18, and isotopes of phosphorus, fluorine, chlorine, bromine, iodine, sulfur, and nitrogen. Isotope-labeled reference samples can generally be substituted at one or more (e.g., two or more, three or more, four or more, five or more, six or more, eight or more, ten or more, or even more) sites within the molecular structure of the reference sample. In some embodiments, every site within the molecular structure of a reference sample corresponding to a certain type of atom can be isotopically substituted (e.g., every C atom can be substituted by a $^{13}C$, or every H atom can be substituted by a $^{2}H$ or $^{3}H$ atom).

The systems and methods described herein can be used with systems that measure a wide variety of biological samples. Examples of such samples include, but are not limited to, blood, plasma, urine, saliva, lymph fluid, interstitial fluid, and cerebrospinal fluid.

In order that the embodiments of the present disclosure may be more readily understood, reference is made to the following examples, which are intended to illustrate the disclosure, but not limit the scope thereof.

Liquid Chromatography-Mass Spectrometry Systems

FIG. 1 is a schematic diagram showing an example of a liquid chromatography-mass spectrometry (LC-MS) system 100. System 100 includes an inlet 102 connected to a liquid chromatography column 104. Column 104 is coupled to a mass spectrometer 106 through an optional valve 122 that is connected to an optional waste reservoir 124. Mass spectrometer 106 includes an ionizer 108, a skimmer 110, quadrupolar stages 112, 114, and 116, and a detector 118. Each of the components can optionally be connected to a controller 120, which typically includes at least one electronic processor, at least one storage unit, at least one display device, and at least one interface for receiving instructions and data from a user of system 100.

During operation of system 100, a sample is introduced into inlet 102, e.g., via direct injection. Following introduction, the sample enters column 104 and is deposited onto the column material (e.g., a resin material). The sample migrates across the column material as one or more solvents flow across the column material. As the sample collectively migrates, different components of the sample migrate at different rates, and therefore reach the end of the column at different times. As mentioned above, the elution time for a certain sample component can be particular to that component, and can be used to identify the component (e.g., by comparing the component's elution time to reference information that includes elution times for known sample components).

Column 104 can optionally be connected to a valve 122 as described above, which can in turn optionally be connected to a waste reservoir 124. During operation of system 100, valve 122 can optionally be activated by controller 120 to direct eluent from column 104 to waste reservoir 124, or to mass spectrometer 106. Selectively directing only portions of the eluent to mass spectrometer 106 can ensure that only components of interest in the sample are measured.

In some embodiments, to facilitate selective direction of portions of the eluent from column 104 to waste receiver 124 or to mass spectrometer 106, valve 122 can include a detector connected to controller 120 that generates an electrical signal when a component of the sample elutes from column 104 and reaches the detector. Controller 120 receives the electrical signal, and can determine whether to direct the eluent into waste reservoir 124 or into mass spectrometer 106. In certain embodiments, controller 120 determines which direction to direct the eluent based on an elapsed time between introduction of the sample at inlet 102, and detection of the component emerging from the downstream end of column 104. In some embodiments, the elapsed time can be compared to reference information that includes elution times from known sample components to yield at least a preliminary identification of the component. Based on that preliminary identification, controller 120 can determine whether the component is of interest (and is therefore directed to mass spectrometer 106), or whether the component is not of interest (and is directed to waste reservoir 124). When sample components are not eluting from column 104 (e.g., at time intervals during which only elution solvents emerge from column 104), the eluent can also optionally be directed to waste reservoir 124 rather than to mass spectrometer 106.

Various detectors can be integrated into valve 122, or more generally, be positioned between column 104 and mass spectrometer 106 to facilitate component detection as the sample components are eluted from column 104. Examples of suitable detectors include, but are not limited to, optical detectors such as photodiodes, photocells, spectral detectors, and CCDs, and electrical detectors such as conductivity sensors and resistivity sensors.

Sample components that enter mass spectrometer 106 are received into ionizer 108, where they are ionized to form a population of ions. Ionizer 108 can be implemented as any of a wide variety of different types of ionizers. Examples of suitable ionizers include, but are not limited to, electrospray ionizers, electron impact ionizers, atmospheric pressure chemical ionizers, thermospray ionizers, inductively coupled plasma ionizers, glow discharge ionizers, and photoionizers.

The population of ions generated in ionizer 108 passes through skimmer 110, which typically includes an aperture of reduced dimension (relative to an exit aperture of ionizer 108), and which reduces the population of ions that are directed into the quadrupole stages of mass spectrometer 106. After passing through skimmer 110, the ions are separated and detected in the remaining portion of mass spectrometer 106.

A wide variety of different mass spectrometer configurations can be used to separate, detect, and analyze ions generated from sample components. Mass spectrometer 106 is one example of such a configuration, and will be discussed in detail below for illustrative purposes. However, it should be understood that the calibration methods described herein can be used with many different configurations of mass spectrometer 106, and are in no way limited to the configuration shown in FIG. 1.

In FIG. 1, mass spectrometer 106 is implemented as a tandem mass spectrometer (e.g., tandem MS/MS), with three quadrupolar stages 112, 114, and 116. In the first quadrupolar stage 112 (also referred to herein as "Q1"), ions that pass through skimmer 110 are filtered to select ions that fall within a particular range of m/z values for further analysis. Ions that fall outside this range of m/z values are blocked, and do not pass through quadrupolar stage 112. Conversely, ions that fall within the desired range of m/z values pass through quadrupolar stage 112 and enter the second quadrupolar stage 114.

In general, quadrupolar stage 112 includes four electrodes arranged about a central symmetry axis. To selectively direct only ions with m/z values that fall within a desired range to the second quadrupolar stage 114, controller 120 adjusts the electrical potential(s) applied to the four electrodes. With suitable potentials applied, the four quadrupolar electrodes generate an oscillating radiofrequency (RF) field, which functions to guide ions from one end to another along the quadrupolar stage 112. For a particular RF field, ions within a certain range of m/z values are guided out of an exit aperture of quadrupolar stage 112, and ions of m/z that fall outside the range are rejected (e.g., blocked) within quadrupolar stage 112.

A subset of the ions that enter first quadrupolar stage 112 pass through stage 112 and enter the second quadrupolar stage 114 (also referred to herein as "Q2"). The second quadrupolar stage 114 is implemented as a collision cell in which ions that enter stage 114 are fragmented to form a distribution of ions of relatively smaller molecular mass. This distribution of smaller mass ions, which are derived from the larger mass ions that typically enter stage 114 from stage 112, passes through stage 114 into third quadrupolar stage 116.

Within second quadrupolar stage 114, controller 120 applies electrical potentials to one or more electrodes to generate one or more electric fields, establishing a field gradient between the entrance and exit apertures of stage 114. Ions entering from stage 112 are typically accelerated by the field gradient. Atoms or molecules of a neutral gas are introduced into stage 114, and collide with the accelerated ions entering from stage 112, generating (via collisions) the ion fragments that pass through to stage 116. Various gases can be used in the fragmentation process including, but not limited to, hydrogen, nitrogen, and noble gases such as argon.

After the distribution of smaller mass ions (referred to herein as the "fragment ions") enters the third quadrupolar stage 116 (also referred to herein as "Q3"), the fragment ions are filtered in a manner similar to the filtering that occurs in stage 112. Specifically, stage 116 includes four electrodes arranged about a central symmetry axis, and controller 120 adjusts one or more electrical potentials applied to the four electrodes to generate an oscillating RF field within stage 116. The generated field guides a subset of the ion fragments, each having a m/z that falls within a particular range, from one end of stage 116 to the other and into detector 118. Ion fragments with m/z values outside this range are rejected (e.g., blocked) within quadrupolar stage 116.

After the subset of the ion fragments guided out of third quadrupolar stage 116 enter detector 118, m/z values for the fragments are measured by the detector. Specifically, measurement signals corresponding to the fragments are generated by detector 118 and transmitted to controller 120, which determines values of m/z for the fragments from the measurement signals.

Detector 118 can incorporate a variety of different detection techniques. In certain embodiments, detector 118 corresponds to an electron multiplier, a Faraday cup, or a microchannel plate detector. In some embodiments, detector 118 is an Orbitrap-based detector. More generally, detector 118 can implement any one or more known ion detection techniques.

Figure 2:
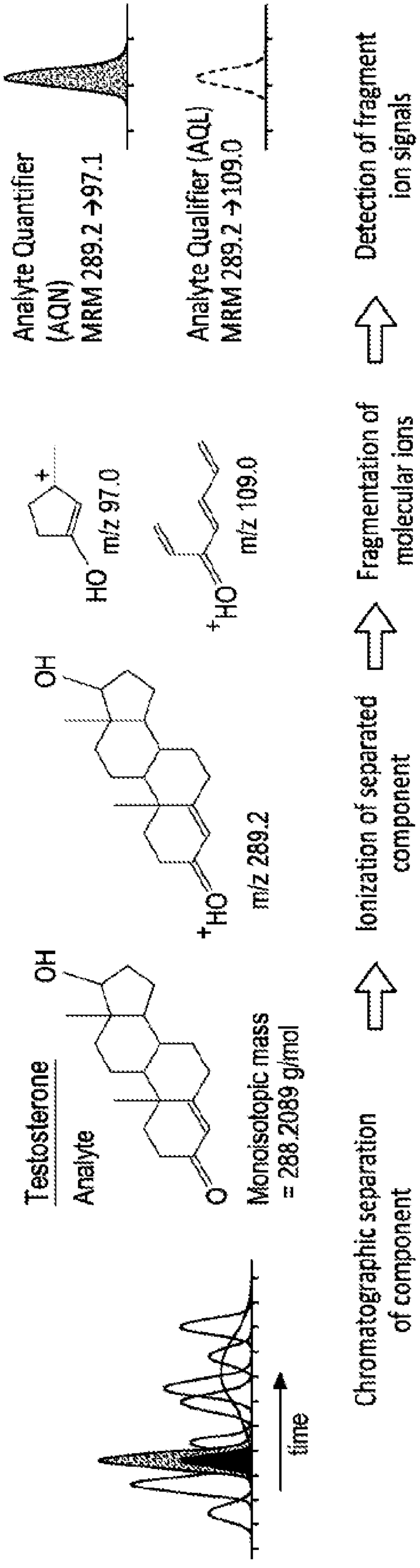
FIG. 2 is a schematic diagram showing an example of a sample analysis workflow using the system of FIG. 1 in accordance with an embodiment of the present disclosure.

The overall workflow implemented by system 100 is illustrated schematically in FIG. 2. Two components of a sample, testosterone and $^{13}$C-labeled testosterone (an internal reference component) are eluted from column 104 at a common time. The components are ionized within ionizer 108 to generate molecular ions of each component. The molecular ions are selectively filtered in stage Q1 and passed to stage Q2, where they undergo fragmentation to form ion fragments of smaller molecular weight than the corresponding molecular ions. The fragment ions are filtered in stage Q3 and passed to detector 118, where they generate detection signals at specific m/z values.

Mass Axis Calibration

System 100 is calibrated so that ion signals generated in detector 118 can be attributed to ions with specific m/z values. This is referred to as the "mass axis calibration" of system 100. In general, the system's mass axis calibration corresponds to a relationship between the physical configuration of a mass-selective filtering element in system 100 and the actual m/z values that correspond to the different configuration settings. Thus, for example, for a mass-selective filtering element in which one or more electrical potentials are applied (e.g., by controller 120) to electrodes of the element to selectively filter ions of a certain m/z value (or range of m/z values), the relationship between the applied electrical potential(s) and the filtered m/z values that correspond to the applied potential(s) is the mass axis calibration.

As used herein, the term "mass-selective filtering element" refers to a component of a mass spectrometry system that allows charged particles of only a certain range of mass values or mass-to-charge ratio values to pass through the element. Such an element is typically, although not always, configurable, so that the range of mass values or mass-to-charge values that are allowed to pass is adjustable. It should be noted that "pass through" refers to the fact that a mass-selective filtering element effectively functions as a "gate" or "barrier" to the flow of charged particles. Mass-selective filtering elements can generally be implemented in a wide variety of forms, including configurations where charged particles enter through an input port and exit through an output (i.e., passing through the element), and configurations where charged particles enter and exit through a common port. Mass-selective filtering elements can also be implemented in configurations where the element deflects charged particles that have mass values or mass-to-charge ratio values either within or outside a selected range of values, or more generally, uses any mechanism to restrict charged particles from arriving at a particular location in the system to only those particles that have mass values or mass-to-charge ratio values that fall within a particular range of values.

In system 100 shown in FIG. 1, both quadrupolar stages Q1 and Q3 are mass-selective filtering elements. Because Q1 and Q3 each function as m/z filters for ions, each stage affects the measurement signal that is generated in detector 118. That is, the mass axis calibration in system 100 is more complex than a relationship between a set of potentials or other configuration settings for a single mass-selective filtering element, and the set of m/z values to which the potentials or settings correspond. Instead, the mass axis calibration for system 100 corresponds to the potentials or configuration settings for both stages Q1 and Q3, and m/z values to which they correspond.

In general, prior to performing measurements with system 100, the system is calibrated so that the relationship between the potentials applied to the electrodes of stages Q1 and Q3 and the m/z values of ions that are filtered by each stage are established. Following calibration, each stage can be independently configured by controller 120 to filter (i.e., allow to pass) ions of only a specific m/z value by applying suitable potentials to the electrodes of each stage, in accordance with the stage's calibration relationship. However, after prolonged use of system 100, and/or following changes in environmental conditions, it has been observed that the mass axis calibration of system 100 can drift, such that m/z values determined for ions measured by detector 118 no longer correspond to actual m/z values for the ions.

Drift of the mass axis calibration for system 100 can have a number of important consequences. In some embodiments, if the drift is sufficiently large, then ions can be misidentified from the mass spectral information measured by system 100. In certain embodiments, a drift of the mass axis calibration causes ion peaks of increased width to be measured by system 100. The increased peak widths result in a loss of resolution, and may increase isotopic interference in samples with components that are similar in structure but differ only in one or more isotopically-labeled positions. Increased peak widths can also result in a reduction in measured ion peak intensity values, which can reduce the sensitivity of system 100, and erroneous peak area measurements, which may yield improper peak area ratio calculations when comparing a sample component of interest to an internal reference component.

Figure 3:
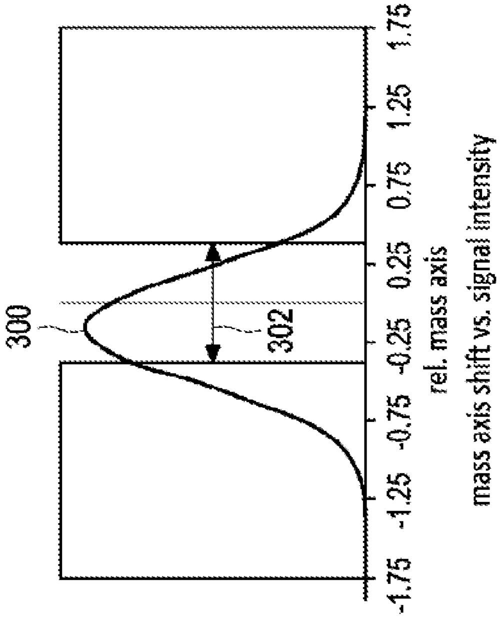
FIG. 3 is a schematic graph showing a measured ion peak and a detection window in accordance with an embodiment of the present disclosure.

The effect of a drift in mass axis calibration is shown schematically in the graph of FIG. 3. In FIG. 3, the measured intensity of an ion peak 300 corresponding to a sample component is shown as a function of mass shift from a nominal value of 0 along the mass axis. The mass axis 0 value represents the center of the effective measurement "window" 302 for ion peak 300. In other words, ion peak 300 is measured by the system within window 302 (which corresponds to a very narrow range of m/z values). Because the mass axis calibration of the system is not aligned with the intensity maximum of ion peak 300, ion peak 300 will instead be detected with measurement window 302 offset from (i.e., centered at a m/z value different from) ion peak 300—such that the integrated peak signal is significantly less than would be measured if measurement window 302 was aligned with ion peak 300. Quantitative measurements that rely on accurate peak intensity measurements can therefore be compromised.

It has been determined that to sufficiently separate components that are isotopically substituted, a unit resolution of 0.7 is suitable, and a mass axis accuracy of ±0.1 amu should be maintained during operation of system 100. To maintain these operating conditions, particularly when system 100 operates over a prolonged period of continuous or near-continuous use and/or is subject to environmental conditions that may fluctuate (whether during operation of system 100 or not), the mass axis calibration should be corrected to account for drift of the system's calibration.

The systems described herein are configured to monitor the mass axis calibration, and to correct the mass axis calibration as needed to ensure that the systems yield accurate, reproducible mass spectral information for sample components. In some embodiments, system 100 verifies the mass axis calibration at regular time intervals, and/or upon receipt of an instruction from a user of system 100. In certain embodiments, system 100 can include one or more sensors that measure environmental conditions, and controller 120 initiates verification of the mass axis calibration based on the sensor measurements. For example, referring to FIG. 1, system 100 can optionally include a temperature sensor 126 connected to controller 120. Temperature sensor 126 can be positioned to measure an ambient temperature of the environment surrounding system 100. Alternatively, temperature sensor 126 can be positioned to measure the temperature of one or more components of system 100. If the temperature measured by sensor 126 is outside of an established temperature range, controller 120 can initiate verification of the mass axis calibration for system 100.

In some embodiments, system 100 verifies the mass axis calibration based on a comparison between parameters associated with measured mass spectral information. For example, controller 120 can determine peak widths associated with one or more sample components, and compare the determined peak widths with peak widths determined from similar sample components at a different time. As one example, if the determined peak widths have increased or decreased sufficiently (e.g., as determined by calculating peak width ratios) in the later measurements, controller 120 can initiate verification of the mass axis calibration of system 100.

To verify the mass axis calibration of system 100, for each mass-selective filtering element of system 100, controller 120 measures signals corresponding to an ion peak of known m/z, with three different mass shifts of the mass-selective filtering element: a negative mass shift, a zero mass shift, and a positive mass shift. The mass shifts are each with respect to the known m/z value for the ion peak that is measured. Thus, for example, for measurement of an ion peak with a known m/z value q, the ion peak is measured at a negative mass shift by adjusting the configuration of the mass-selective filtering element to pass ions of m/z value (q−a), where a is the negative mass shift. For measurement of an ion peak at a zero mass shift, the configuration of the mass-selective filtering element is adjusted to pass ions of m/z value q. For measurement of an ion peak at a positive mass shift, the configuration of the mass-selective filtering element is adjusted to pass ions of m/z value (q+b), where b is the positive mass shift.

Figure 4:
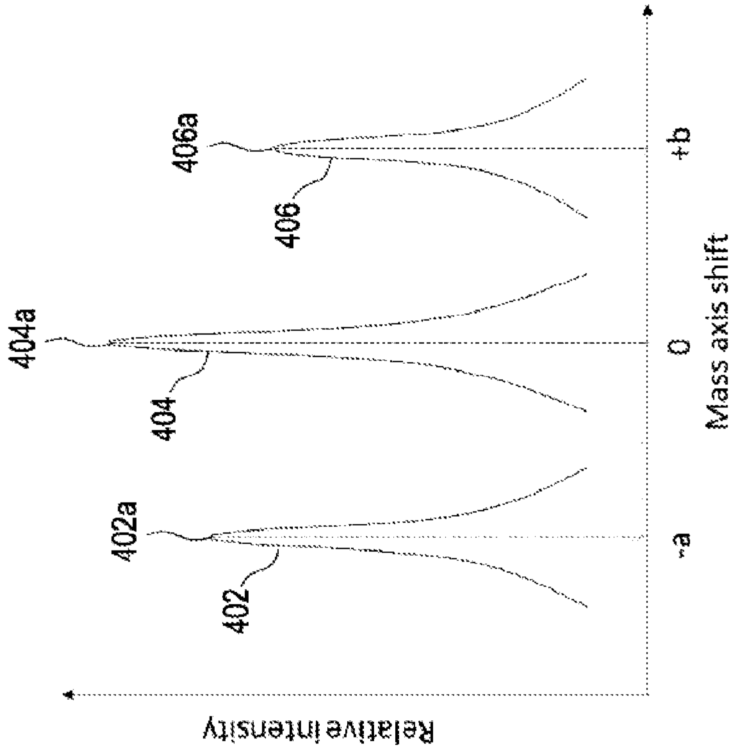
FIG. 4 is a schematic graph showing ion peaks corresponding to three different mass shift values in accordance with an embodiment of the present disclosure.

FIG. 4 is a schematic graph showing measured ion peaks corresponding to a negative mass shift −a (peak 402), a zero mass shift (peak 404), and a positive mass shift +b (peak 406). The peaks have intensity maxima 402*a*, 404*a*, and 406*a*, respectively. After the intensity maxima have been determined, the intensity maximum values are fitted to a functional form with a local maximum within the mass shift interval (−a,+b). The local maximum represents the mass axis shift, which is the deviation of the mass axis calibration from the actual m/z value for the ion that is measured.

Figure 5:
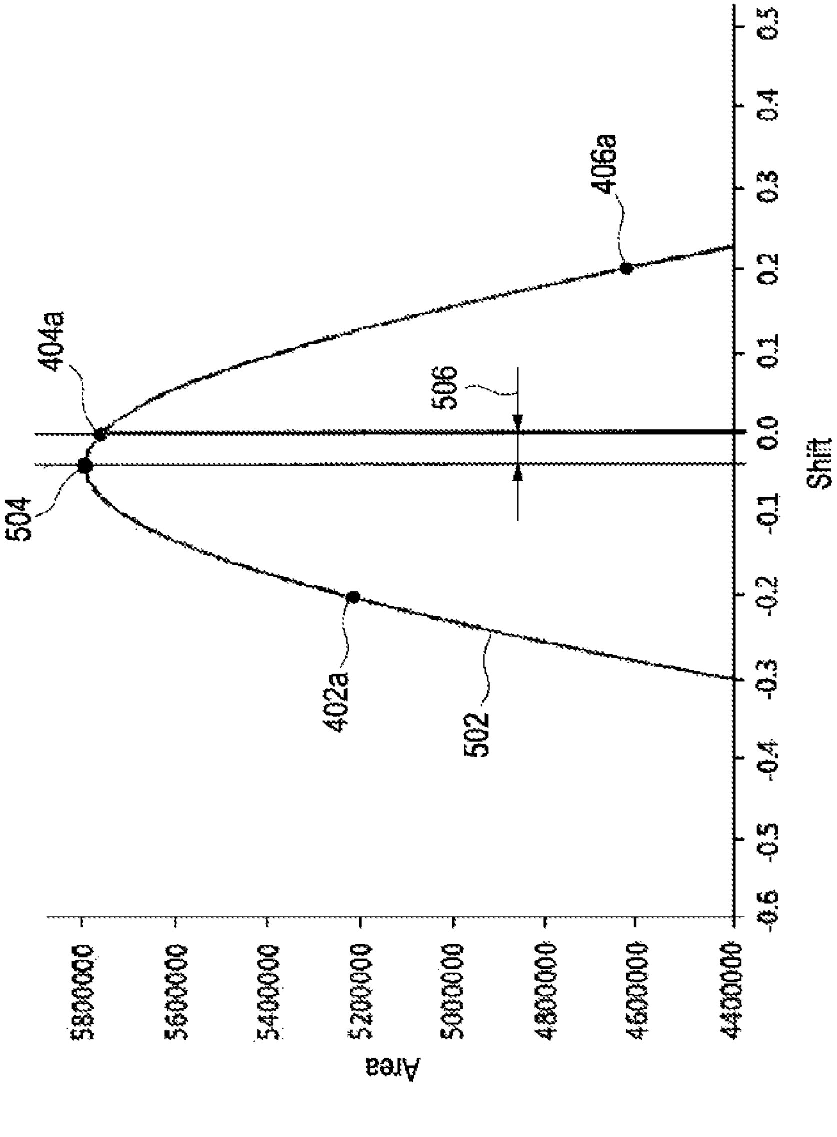
FIG. 5 is a schematic graph showing ion peak intensity measurements fitted to a functional form, and a mass axis shift relative to a nominally zero mass shift in accordance with an embodiment of the present disclosure.

FIG. 5 is a schematic graph showing the measured intensity maxima 402*a*, 404*a*, and 406*a*, plotted as a function of mass shift. The intensity maxima have been fitted to a functional form 502 with a local maximum 504 within the mass shift interval defined by maxima 402*a*, 404*a*, and 406*b*. Intensity maximum 404*a* corresponds to the measurement of the ion peak at a zero mass shift value. If system 100 was perfectly calibrated, the local maximum 504 of functional form 502 would be the same as maximum 404*a*. However, due to a drift in the calibration of system 100, the local maximum 504 is no longer aligned with maximum 404*a*, indicating that the mass axis calibration of system 100 should be adjusted to match the known m/z value of the ion peak.

The mass axis shift—the amount by which the mass axis calibration should be adjusted to compensate for drift—is represented by the difference between the mass axis shifts of local maximum 504 and maximum 404*a*. Controller 120 determines this value in system 100, and then applies the correction to the calibration of the mass-selective filtering element of system 100. For example, if the calibration information for system 100 corresponds to a functional relationship (e.g., a calibration curve) between one or more applied potentials (or other configuration settings) and a corresponding filtered m/z value for the mass-selective filtering element, controller 120 applies an appropriate offset to the functional relationship to account for the drift. In some embodiments, controller 120 applies corrections to m/z values that were originally used to determine the functional relationship, and re-calculates the functional relationship between the one or more applied potentials (or other configuration settings) and the corresponding filtered m/z values.

In some embodiments, the magnitudes of the negative mass shift a and the positive mass shift b are the same. In certain embodiments, the magnitudes of a and b are different. Different shift magnitudes can be used, for example, when a mass axis shift is likely to have occurred in a biased manner. By selecting negative and positive mass shifts of different magnitude, it can be possible to resolve the local maximum 504 of functional form 502 more accurately, thereby yielding a more accurate measurement of the mass axis shift 506.

The magnitudes of mass shifts a and b can generally be selected to ensure that both negative and positive mass shifts are adequately sampled. Accordingly, the magnitude of a and/or the magnitude of b can be 0.01 atomic mass units (amu) or more (e.g., 0.03 amu or more, 0.05 amu or more, 0.07 amu or more, 0.1 amu or more, 0.12 amu or more, 0.15 amu or more, 0.2 amu or more, 0.25 amu or more, 0.3 amu or more, 0.35 amu or more, 0.4 amu or more).

The detected ion peak used to measure the peak intensities shown in FIGS. 4 and 5 corresponds to a particular sample component, and as discussed above, in general, an ion peak associated with any sample component can be used to measure the peak intensities. However, it has also been found that to avoid detecting an ion peak corresponding to an isotopically substituted counterpart of the sample component, it can be advantageous if the magnitudes of a and/or b are 0.2 amu or less (e.g., between 0.2 amu and 0.01 amu, between 0.15 amu and 0.01 amu, between 0.1 amu and 0.01 amu, between 0.05 amu and 0.01 amu).

In some embodiments, as shown in FIGS. 4 and 5 and described above, ion peak intensity measurements are performed at three different mass shifts: −a, 0, and +b. More generally, however, to improve the accuracy with which mass axis shift 506 is calculated, ion peak intensity measurements can be performed at more than three different mass shifts. For example, in some embodiments, ion peak intensity measurements can be performed at multiple negative mass shifts, represented by the values $(-a_1) \ldots (-a_n)$, where n is the number of negative mass shift values. In general, n can be 1 or more (e.g., 2 or more, 3 or more, 4 or more, 5 or more, 7 or more, 10 or more, or even more).

Similarly, to improve the accuracy with which mass axis shift 506 is calculated, ion peak intensity measurements can be performed at multiple positive mass shifts, represented by the values $(+b_1) \ldots (+b_m)$, where m is the number of positive mass shift values. In general, m can be 1 or more (e.g., 2 or more, 3 or more, 4 or more, 5 or more, 7 or more, 10 or more, or even more).

In some embodiments, the number of negative mass shift values n and the number of positive mass shift values m is the same. In certain embodiments, n and m are different. For example, if the mass axis shift is biased, it can be advantageous for either n or m to be larger, depending on the bias direction. In other words, for a positive mass axis shift, it can be advantageous for m to be larger than n. Conversely, for a negative mass axis shift, it can be advantageous for n to be larger than m.

In certain embodiments, the total number of mass shift values at which peak intensity measurements are made and fitted to functional form 502 is 3 or more (e.g., 4 more, 5 or more, 6 or more, 7 or more, 8 or more, 10 or more, 12 or more, 15 or more, or even more). The total number of mass shift values can generally be even or odd.

In some embodiments, a peak intensity value corresponding to a mass shift of zero is not fitted to functional form 502. In other words, peak 404*a* in FIG. 4 is not fitted to functional form 502. The local maximum 504 of functional form 502 is still determined in the same manner, however, and the mass axis shift 506 can still be calculated from the difference in mass shift of local maximum 506 and peak intensity 404*a*, as described above.

In some embodiments, functional form 502 is a Gaussian functional form. It has been discovered that by using a Gaussian functional form to represent the correlation between measured peak intensities and the mass shift, a particularly accurate mass axis shift can be calculated based on the local maximum 504 of the Gaussian functional form. In certain embodiments, other functional forms with a local maximum within the mass shift interval (−a,+b) can be used. For example, a parabolic functional form, a polynomial functional form, and an exponential functional form can be used. More complex functional forms, including combinations of any of the foregoing functional forms and/or other functional forms, can also be used.

In the foregoing discussion, peak intensities 402*a*, 404*a*, and 406*a* are fitted to functional form 502 to determine local maximum 504. However, quantities other than peak intensity can be fitted to functional form 502 and used to determine the mass axis shift. For example, in some embodiments, the integrated area under each of peaks 402, 404, and 406 in FIG. 4 can be calculated and fitted to functional form 502 to determine the mass axis shift. In certain embodiments, the widths (e.g., the full-widths at half maximum) of peaks 402, 404, and 406 in FIG. 4 can be calculated and fitted to functional form 502 to determine the mass axis shift. In certain embodiments, another parameter associated with peaks 402, 404, and 406, such as a first derivative value at one or more points on each of the peaks, or a second derivative value at one or more points on each of the peaks, can be calculated and fitted to functional form 502 to determine the mass axis shift. Combinations of any of the foregoing quantities (and other quantities) can also be fitted to functional form 502, particularly when it is determined that such combinations yield a more accurate measurement of the mass axis shift 506.

In some embodiments, multiple mass axis shifts can be determined for system 100 based on different criteria, and a final mass axis shift 506 is then determined by controller 120 based on the set of mass axis shifts. For example, a first mass axis shift can be determined by fitting measured values associated with a first attribute of peaks 402, 404, and 406 in FIG. 4 to a first functional form, thereby determining the first mass axis shift as described above. Then, measured values associated with a second attribute of peaks 402, 404, and 406—different from the first attribute—can be fitted to a second functional form, thereby determining the second mass axis shift as described above.

In general, the set of peaks used to determine the first and second mass axis shifts can be the same or different (i.e., the peaks can correspond to the same set of mass shifts, or a different set of mass shifts). Moreover, the sets of peaks can correspond to an ion associated with a common sample component, or the set of peaks used to determine the first mass axis shift can be associated with a first sample component, and the set of peaks used to determine the second mass axis shift can be associated with a second sample component. Further still, the set of peaks used to determine the first mass axis shift can be associated with a first ion derived from a sample component, and the set of peaks used to determine the second mass axis shift can be associated with a second ion, different from the first ion, but also derived from the sample component.

The number of peaks used to determine the first mass axis shift can be same as, or different from, the number of peaks used to determine the second mass axis shift. Further, the first and second functional forms can be the same or different, depending upon criteria such as the nature of the peak attributes that are fitted, and the accuracy of different functional forms in determining the mass axis shift based on the fitted peak attributes.

While the foregoing example refers to two different mass axis shifts, it should be understood that more generally, the systems and methods described herein can measure any number of different mass axis shift values before determining a final mass axis shift value. The final mass axis shift value can be determined in various ways. In some embodiments, for example, the members of the set of mass axis shift values are averaged to determine the final mass axis shift value. In certain embodiments, the final mass axis shift value is determined as the most common mass axis shift value among the set of values. In some embodiments, the final mass axis shift value is determined as the median value among the set of mass axis shift values. Other methods for determining the final mass axis shift value from among the set of mass axis shift values can also be used.

The foregoing discussion focuses on determining a mass axis shift value to correct a mass axis calibration associated with a single mass-selective filtering element in system 100. Referring to FIG. 1, however, system 100 includes two mass-selective filtering elements: quadrupolar stages Q1 and Q3. The foregoing methods are applicable to determining mass axis shift values and correcting mass axis calibrations for each mass-selective filtering element in system 100. More generally, for a system 100 that includes M mass-selective filtering elements, the foregoing methods can be used to determine M independent mass shift values and, therefore, M independent corrections to mass axis calibrations, one for each of the M mass-selective filtering elements.

To evaluate the effectiveness of the foregoing methods for determining mass axis shifts and associated mass axis calibration adjustments for stages Q1 and Q3 in system 100, a sample containing serum spiked with testosterone, gabapentin, cyclosporine, and $^{13}$C-labeled internal reference compounds testosterone-$^{13}$C3, gabapentin-$^{13}$C3, and cyclosporine-d10 was introduced into system 100. For each of these components, five different ion peaks were measured, corresponding to the mass shifts in the Q1 and Q3 stages shown in Table 1.

TABLE 1

| Peak | Q1 mass shift (amu) | Q3 mass shift (amu) |
|---|---|---|
| 1 | 0 | 0 |
| 2 | +0.2 | 0 |
| 3 | −0.2 | 0 |
| 4 | 0 | +0.2 |
| 5 | 0 | −0.2 |

Measurements were repeated 10 times, and the measured ion peaks were integrated. The mass axis shifts were determined for each of the Q1 and Q3 stages for each of the non-labeled spiked components of the sample based on integrated peak area values. For each of the Q1 and Q3 stages, a final mass axis shift was calculated as a median of the set of mass axis shifts determined for that stage from each of the non-labeled spiked components of the sample. The Q1 and Q3 stages of system 100 were then corrected so that their mass axis calibrations reflected the corresponding final mass axis shifts determined for each stage.

It should be noted that in the above investigation, both analytes and isotopically-labeled counterparts thereof were present in the analyzed sample. In general, isotopically-labeled counterparts of analytes of interest can be introduced for purposes such as compensating to irregularities during sample preparation. Because they are generally introduced at known concentrations, they provide an internal reference standard for each analyte of interest.

Measurements associated with either unlabeled analytes, with isotopically-labeled reference compounds, or with both, can be used to determine mass axis shifts in the methods described herein. In some embodiments, due to their known concentrations in the sample, isotopically-labeled counterparts of analytes of interest are used to determine mass axis shifts, particularly when the concentration of an analyte of interest is unknown and may be too low to reliably provide suitable measurement signals for determining mass axis shifts. In certain embodiments, both non-labeled analytes and labeled counterparts are used to determine mass axis shifts.

It should also be noted that reference compounds added to the sample and used to determine mass axis shifts need not be isotopically labeled. In general, any reference compound can be added to a sample and used in the methods described herein to determine a mass axis shift and to correct a mass axis calibration.

After correction of the mass axis calibration, the above measurements for each of the non-labeled spiked components of the sample were repeated, and the mass axis shifts for each of Q1 and Q3 were calculated for each component. Table 2 shows mass axis drifts calculated for the components of the sample before and after correction of the mass axis calibrations of the Q1 and Q3 quadrupolar stages of system 100.

TABLE 2

| Sample Component | Quadrupolar Stage | Mass Axis Shift Magnitude Before Correction (amu) | Mass Axis Shift Magnitude After Correction (amu) |
|---|---|---|---|
| Gabapentin | Q3 | 0.050 | −0.009 |
| Testosterone | Q3 | 0.100 | −0.034 |
| Cyclosporin | Q1 | 0.371 | −0.177 |
| Testosterone | Q1 | 0.010 | 0.003 |

As is evident from the data shown in Table 2, the mass axis shifts measured after correction of the mass axis calibrations of stages Q1 and Q3 according to the methods described herein are, in some circumstances, more than an order of magnitude smaller than the initial mass axis shifts. This significant reduction in the mass axis shifts provides a strong indication that the methods described herein are highly effective for re-calibrating mass spectrometric-based analysis systems to compensate for mass axis shifts that result from calibration drift.

Hardware and Software Components

Controller 120 can be implemented with a variety of different hardware and software components, and combinations thereof. In some embodiments, controller 120 includes at least one electronic processor capable of executing software-based instructions for performing any of the functions described herein. In certain embodiments, controller 120 includes one or more dedicated electronic circuits, such as application-specific integrated circuits (ASICs) capable of performing any of the functions described herein.

Controller 120 can optionally include at least one memory unit. The memory unit can include, for example, a random access memory (RAM), a read-only memory (ROM), and/or any other type of volatile or non-volatile storage medium for software instructions.

Controller 120 can optionally include at least one storage unit. The storage unit can include any type of medium for storing information readable by the controller (e.g., one or more electronic processors of the controller), including software instructions, calibration settings and information (including mass axis calibration settings and information, such as one or more calibration curves/relationships and corresponding mass spectral information used to determine the calibration curves/relationships), measured information (e.g., mass spectral information measured by detector 118 and transmitted to controller 120), and data values and other information determined by controller 120 from the measured information. The at least one storage unit can include various types of tangible storage media, including magnetic storage devices such as hard drives, persistent solid-state storage devices, re-writable and non-re-writable optical storage media such as CDs and DVDs, programmable circuit elements such as FPGAs, and other types of writable and non-writable storage media.

Controller 120 can optionally include at least one interface to allow system 100 to transmit information and/or receive information. The interface can include, for example, a display unit for displaying information to a user of system 100. The interface can include a transmitter to allow system 100 to transmit information to remote devices via one or more networks, including dedicated peer-to-peer networks, wireless networks, and distributed networks such as the internet. The interface can include a human interface device that includes one or more components such as a keyboard, a mouse, a touchscreen, a keypad, a remote control, and any other similar component that permits a user to issue instructions to system 100. The interface can also include a receiver for receiving information from remote devices via any of the networks described above.

System 100 can include software instructions that, when executed by controller 120, cause controller 120 to perform any of the functions described herein. The software instructions can be encoded in any of the storage media described above, embodied in any of the memory units described above, encoded in the circuitry of any of the processors or ASICs of controller 120, or can be received by controller 120 via a receiver from a remote device, installed into a memory unit or storage unit of controller 120, and executed by the one or more processors.

Software instructions can be implemented in computer programs using standard programming techniques. Each such computer program can be implemented in a high-level procedural or object-oriented programming language, or an assembly or machine language. The language can be a compiled or interpreted language, and specific operations or steps executable by one or more processors and/or electronic circuits of controller 120 can optionally be dynamically generated by execution of the computer programs.

Other Embodiments

It is to be understood that the foregoing description is intended to illustrate and not limit the scope of the disclosure, and embodiments other than those expressly described are within the scope of the disclosure.

What is claimed is:

1. A system for analyzing a biological sample, the system comprising:
- a separation unit configured to separate a component from the biological sample;
- an ionization unit configured to generate a plurality of ions from the component;
- an adjustable mass-selective filtering element;
- a detector configured to detect ions that pass through the mass-selective filtering element; and
- a controller connected to the mass-selective filtering element and to the detector, wherein the controller is configured so that during operation of the system, the controller:
  - adjusts the mass-selective filtering element and activates the detector to measure at least three different ion signals corresponding to the plurality of ions; and
  - determines a mass axis shift of the system based on the at least three different ion signals,
- wherein:
- the ionization unit generates the plurality of ions from the component of the biological sample, and
- the detector measures the at least three different ion signals corresponding to the plurality of ions.

2. The system of claim 1, wherein each of the three different ion signals corresponds to a different mass-to-charge ratio for the mass-selective filtering element.

3. The system of claim 1, wherein the mass-selective filtering element comprises a quadrupolar electrode assembly.

4. The system of claim 1, wherein each of the at least three different ion signals corresponds to a common ion type among the plurality of ions.

5. The system of claim 4, wherein the common ion type has an associated mass-to-charge value q, and wherein the controller is configured to activate the detector to measure a first ion signal of the at least three different ion signals with the mass-selective filtering element adjusted to pass ions having a mass-to-charge ratio of $(q-a)<q$.

6. The system of claim 5, wherein a is 0.4 atomic mass units (amu) or less.

7. The system of claim 5, wherein the controller is configured so that during operation of the system, the controller activates the detector to measure a second ion signal of the at least three different ion signals with the mass-selective filtering element adjusted to pass ions having a mass-to-charge ratio of $(q+b)>q$.

8. The system of claim 7, wherein b is 0.4 amu or less.

9. The system of claim 7, wherein the controller is configured so that during operation of the system, the controller activates the detector to measure a third ion signal of the at least three different ion signals with the mass-selective filtering element adjusted to pass ions having a mass-to-charge ratio of q.

10. The system of claim 4, wherein the controller is configured so that during operation of the system, the controller determines the mass axis shift based on attribute values of the at least three different ion signals.

11. The system of claim 10, wherein the controller is configured so that during operation of the system, the controller fits a functional form to the attribute values, determines a local maximum of the functional form, and determines the mass axis shift based on the local maximum of the functional form.

12. The system of claim 11, wherein the functional form corresponds to at least one member selected from the group consisting of a Gaussian function or a polynomial function.

13. The system of claim 11, wherein the common ion type has an associated mass-to-charge value q, and wherein the controller is configured so that during operation of the system, the controller determines the mass axis shift by determining a mass shift associated with the local maximum of the functional form relative to the mass-to-charge value q.

14. The system of claim 1, wherein the controller is configured so that during operation of the system, the controller adjusts a mass axis calibration for the mass-selective filtering element based on the mass axis shift.

15. The system of claim 14, wherein the controller is configured so that during operation of the system the controller:
- determines a value of an attribute of at least one ion signal measured by the detector and corresponding to the biological sample; and
- determines a new mass axis shift value of the system and adjusts the mass axis calibration for the mass-selective filtering element based on the new mass axis shift value if the attribute value is outside a selected range of values for the attribute.

* * * * *